(12) United States Patent
Merkle et al.

(10) Patent No.: US 11,553,207 B2
(45) Date of Patent: Jan. 10, 2023

(54) CONTOUR MODE PREDICTION

(71) Applicant: Fraunhofer-Gesellschaft zur Förderung der angewandten Forschung e.V., Munich (DE)

(72) Inventors: Philipp Merkle, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 80 days.

(21) Appl. No.: 17/126,121

(22) Filed: Dec. 18, 2020

(65) Prior Publication Data

US 2021/0112272 A1     Apr. 15, 2021

Related U.S. Application Data

(63) Continuation of application No. PCT/EP2019/066908, filed on Jun. 25, 2019.

(30) Foreign Application Priority Data

Jun. 27, 2018 (EP) .................................. 18180230

(51) Int. Cl.
*H04N 19/59* (2014.01)
*H04N 19/119* (2014.01)
(Continued)

(52) U.S. Cl.
CPC ........... *H04N 19/59* (2014.11); *H04N 19/119* (2014.11); *H04N 19/132* (2014.11); *H04N 19/176* (2014.11)

(58) Field of Classification Search
CPC .... H04N 19/176; H04N 19/593; H04N 19/11; H04N 19/103
See application file for complete search history.

(56) References Cited

U.S. PATENT DOCUMENTS

2003/0138150 A1* 7/2003 Srinivasan ........... H04N 19/154
375/E7.199
2011/0274170 A1* 11/2011 Paz ........................ H04N 19/85
375/240.13
(Continued)

FOREIGN PATENT DOCUMENTS

WO     2020002373 A1    1/2020

OTHER PUBLICATIONS

Van Der Auwera (Qualcomm) G et al, "Description of Core Experiment 3 (CE3): Intra Prediction and Mode Coding", No. JVET-J1023, (Jun. 21, 2018), 10. JVET Meeting; Apr. 10, 2018-Apr. 20, 2018; San Diego; (The Joint Video Exploration Team of ISO/IEC JTC1/SC29/WG11 and ITU-T SG.16) URL:http://phenix.int-evry.fr/jvet/doc_end_user/documents/10_San Diego/wg11/JVET-J1023-v3.zip JVET-J1023r2_with_markups.docx, (Jun. 21, 2018), XP030198638.
(Continued)

*Primary Examiner* — Daniel Chang
(74) *Attorney, Agent, or Firm* — McClure, Qualey & Rodack, LLP

(57) ABSTRACT

A video decoder and method for supporting a prediction mode for predicting blocks of a video is configured to predict each of the blocks by extrapolating a neighborhood of the respective block into the block along a direction which varies across the respective block.

12 Claims, 10 Drawing Sheets

(51) Int. Cl.
*H04N 19/132* (2014.01)
*H04N 19/176* (2014.01)

(56) References Cited

U.S. PATENT DOCUMENTS

| | | | | |
|---|---|---|---|---|
| 2011/0286521 | A1* | 11/2011 | Amonou | H04N 19/176 |
| | | | | 375/E7.243 |
| 2014/0003518 | A1* | 1/2014 | Bang | H04N 19/46 |
| | | | | 375/240.12 |
| 2014/0064368 | A1* | 3/2014 | Minezawa | H04N 19/157 |
| | | | | 375/240.12 |
| 2014/0341290 | A1* | 11/2014 | Merkle | H04N 19/51 |
| | | | | 375/240.16 |
| 2015/0063438 | A1* | 3/2015 | Kim | H04N 19/11 |
| | | | | 375/240.02 |
| 2017/0332093 | A1 | 11/2017 | Merkle et al. | |
| 2017/0366807 | A1* | 12/2017 | Thoreau | H04N 19/11 |
| 2018/0041779 | A1* | 2/2018 | Zhang | H04N 19/117 |
| 2019/0068976 | A1* | 2/2019 | Yamori | H04N 19/136 |
| 2019/0104303 | A1* | 4/2019 | Xiu | H04N 19/59 |
| 2019/0141318 | A1* | 5/2019 | Li | H04N 19/11 |
| 2019/0208201 | A1* | 7/2019 | Yasugi | H04N 19/96 |
| 2019/0306499 | A1* | 10/2019 | Zhang | H04N 19/176 |
| 2019/0356909 | A1* | 11/2019 | Lainema | H04N 19/19 |
| 2020/0036966 | A1* | 1/2020 | Na | H04N 19/176 |
| 2021/0112268 | A1* | 4/2021 | Ko | H04N 19/593 |
| 2021/0136364 | A1* | 5/2021 | Ko | H04N 19/105 |

OTHER PUBLICATIONS

Albrecht M et al, "Description of SDR, HDR and 360° video coding technology proposal by Fraunhofer HHI", 10. JVET Meeting; Apr. 10, 2018-Apr. 20, 2018; San Diego; (The Joint Video Exploration Team of ISO/IEC JTC1/SC29/WG11 and ITU-T SG.16); URL: http://phenix.int-evry.fr/jvet/, (Apr. 12, 2018), No. JVET-J0014-v4, XP030151173.

Video coding standards AVC/H.264 and HEVC/H.265, posted on Apr. 9, 2019; by Russell Trafford-Jones; https://thebroadcastknowledge.com/2019/04/09/video-hevc-h-265-video-coding-standard/.

International Search Report and Written Opinion, dated Oct. 15, 2019 from PCT/EP2019/066908.

* cited by examiner

(12) United States Patent US 11,553,207 B2

CONTOUR MODE PREDICTION

CROSS-REFERENCES TO RELATED APPLICATIONS

This application is a continuation of copending International Application No. PCT/EP2019/066908, filed Jun. 25, 2019, which is incorporated herein by reference in its entirety, and additionally claims priority from European Application No. EP 18180230.7, filed Jun. 27, 2018, which is incorporated herein by reference in its entirety.

The present application is concerned with video coding/decoding.

BACKGROUND OF THE INVENTION

All relevant video coding standards, like AVC/H.264 or HEVC/H.265, follow the so-called hybrid approach as shown, for example, in FIG. 1, where predictive coding is combined with transform coding of the prediction residual. For generating the prediction signal, two possible modes are supported by these standards, namely INTRA prediction and INTER prediction. In AVC/H.264, the decision between these two modes can be made at macroblock (16×16 luma samples) level, and in HEVC/H.265 at Coding Unit (CU) level, which can be of varying size. In INTRA prediction, sample values of already reconstructed neighboring blocks of the current block can be used for generating the prediction signal. How this INTRA prediction signal is formed from the neighboring reconstructed sample values, is specified by the INTRA prediction mode. In INTER prediction, already reconstructed frames (in coding order) can be used for generating the prediction signal. For INTER prediction, in both AVC/H.264 and HEVC/H.265, either uni or bi prediction is used. For uni prediction, the prediction signal is a shifted and interpolated region of a so-called reference picture. The used reference picture is specified by the reference index and the location of the (possibly interpolated) region within the reference picture is specified (relatively to the current block) by the motion vector. The motion vector itself is predictively encoded relatively to a motion vector predictor, such that only the motion vector difference has to be actually encoded. In HEVC/H.265, the motion vector predictor is selected by transmitting a motion vector predictor index. In both AVC/H.264 and HEVC/H.265, motion vectors can be specified with an accuracy of a quarter pel (qpel). The process of generating such an (interpolated) prediction signal is also called motion-compensated prediction. In bi prediction, two motion-compensated prediction signals are linearly superposed (typically using a factor of 0.5 for both constituent prediction signals). Therefore, for bi-prediction two reference indices and motion vector differences (and motion vector predictor indices, in HEVC/H.265) have to be transmitted.

In order to simplify the encoding of contiguous areas having the same motion characteristics, HEVC/H.265 supports the so-called MERGE mode, where prediction parameters (i.e., reference indices and motion vectors) of either locally neighboring or temporally co-located blocks can be re-used for the current block. The SKIP mode of HEVC/H.265 is a particular case of MERGE, where no prediction residual is transmitted.

As an example, an intra-picture estimation/prediction of the hybrid video codec of FIG. 1 based on rectangular blocks of size, e.g., W×H as shown FIG. 2 performs as explained below.

The sample values of the current block 2 are predicted using reconstructed sample values of previous coded blocks in the same picture, i.e., reference samples 4. Usually, reference samples 4 are adjacent samples left (side) and above of the current block 2.

Prediction modes describe different processes for calculating/deriving the predicted sample value at a specific position in the current block 2 from sample values of one or more reference samples 4, for instance Planar, DC and Angular prediction modes in HEVC. These modes can be grouped into those for homogeneous regions (Planar and DC prediction modes) and those for directional structures (Angular prediction mode). The intra encoding process consists of choosing or estimating the intra prediction mode, which is transmitted to the decoder in the data stream.

The angular prediction process consists of continuing/copying the reference samples 4 into the current block 2 with a given direction or angle. FIG. 3 shows an example of the different supported directions. These are grouped into two categories, namely horizontal (H) and vertical (V) angular prediction, where horizontal mainly uses the left (H) and vertical mainly uses the above (V) reference samples 4.

The samples of the block are predicted in a line-by-line order. Therefore, rows and columns are swapped for horizontal angular prediction. Now, the line of reference samples 4 is typically on top of the block, such that every line can be filled with a shifted version of the reference samples. The shift or offset value is determined by the prediction direction.

As shown in FIG. 4, for the sample, i.e., the area to be predicted, at position (x,y) the corresponding reference sample position is $$x_r = x + \alpha \cdot y$$

with offset $$\alpha = \frac{\Delta x_D}{32} \in [-1, 1].$$

In FIG. 3, the values of $\Delta x_D$ are shown next to the H and V labels, e.g., in the range from −32 to +32. In most cases, $x_r$ is not an integer position and therefore the value of sample (x,y) results from interpolating two (or more) reference sample values.

The development of modern video codecs tends towards larger block sizes in combination with non-square (e.g., rectangular) block shapes. Regarding intra-picture prediction and especially the angular prediction mode described above, this might be inefficient. A close prediction of the real signal of a larger block is only possible, if the signal continues linearly in the exact direction of the angular mode over quite a few numbers of rows/columns without any larger deviations.

One obvious solution of this problem is to split the block into smaller blocks, each with an individually adapted angular prediction direction and each with an individual residuum as shown in FIG. 5. However, this solution tends to result in higher signaling costs and smaller instead of larger blocks, and therefore, as a result it causes decreasing the coding efficiency.

As mentioned above, the available and supported prediction modes of now a days video codecs are already pretty effective in terms of keeping the prediction residual low at a reasonable amount of prediction side information that may be used in order to control the prediction using these prediction modes. However, there are some deficiencies to further improve the coding efficiency using the available prediction modes, and therefore, it would be favorable to further increase the coding efficiency of block-based predictive video codecs.

SUMMARY

An embodiment may have a video decoder for supporting a prediction mode for predicting blocks of a video, wherein the video decoder is configured to predict each of the blocks by extrapolating a neighborhood of the respective block into the block along a direction which varies across the respective block so that the direction for a current block to be predicted is changed based on a sample block which has been previously predicted.

Another embodiment may have a video encoder for supporting a prediction mode for predicting blocks of a video, wherein the video decoder is configured to predict each of the blocks by extrapolating a neighborhood of the respective block into the block along a direction which varies across the respective block so that the direction for a current block to be predicted is changed based on a sample block which has been previously predicted.

Yet another embodiment may have a method for supporting a prediction mode for predicting blocks of a video, wherein the video decoder is configured to predict each of the blocks by extrapolating a neighborhood of the respective block into the block along a direction which varies across the respective block so that the direction for a current block to be predicted is changed based on a sample block which has been previously predicted.

Yet another embodiment may have a non-transitory digital storage medium having a computer program stored thereon to perform the inventive method, when said computer program is run by a computer.

Yet another embodiment may have a data stream generated by an inventive method.

It is basic idea underlying the subject-matter of the present application that a coding efficiency increase is achievable by applying a prediction mode to predict a number of blocks of a picture by extrapolating a neighborhood of the respective block into the block along a direction which varies across the respective block. That is, according to the prediction mode of the present application, i.e., a contour prediction mode, the prediction direction for the current block to be predicted is changed based on the sample block which has been previously predicted. That means, it is possible to change the prediction direction within the same block between the lines of the samples of the block is composed of, and therefore, a larger block is predicted more preciously with less prediction error. The side information, in turn, may be kept low and, additionally, large block size (a coarse block granularly), is feasible, so that it is possible to reduce signaling costs even further and as a result improve the coding efficiency.

In accordance with the embodiments of the present application, the direction across the respective block in unit of lines of samples the respective block is composed of, or in unit of groups of lines of samples into which the block is partitioned, is varied based on one or more offset values indicating an offset of sample positions at which the neighborhood is to be sampled for predicting a predetermined line or predetermined group of lines relative to further sample positions at which the neighborhood is to be sampled for predicting a further line or further group of lines adjacent to the predetermined line or predetermined group of lines. That is, the prediction direction is changed for each line of samples (e.g., the line of blocks to be predicted) or each of groups of lines of samples (the group of lines of samples to be predicted), based on the determined offset value. Therefore, it is possible to improve the predict efficiency for a larger block.

In accordance with the embodiments of the present application, the offset value for each line of samples or each group of lines is determined by reading a parameter indexing one of a global offset value for the respective block, a first predetermined offset value, or a second predetermined offset value, wherein the first predetermined offset value and the second predetermined offset value indicate offsets of the sample positions relative to the further sample positions into opposite directions. For example, the offset values may be typically expressed as $\Delta x_C(n) \in [-32 \ldots 32]$ with $$\alpha(n) = \frac{\Delta x_C(n)}{32}.$$

In this case, the first predetermined offset value could be −32 and the second predetermined offset value could be +32 (or vice versa), and then, the global offset value is between the first and the second predetermined offset value. Thus, the offset value is determined by reading parameter indexing and therefore, it is possible to efficiently predict non-liner contour and as a result the coding efficiency is also improved.

BRIEF DESCRIPTION OF THE DRAWINGS

Embodiments of the present invention will be detailed subsequently referring to the appended drawings, in which.

DETAILED DESCRIPTION OF THE INVENTION

The following description of the figures starts with a presentation of a description of video encoder and video decoder of a block-based predictive codec for coding pictures of a video in order to form an example for a coding framework into which embodiments for a composed prediction codec may be built in. The video encoder and video decoder are described with respect to FIGS. 6 to 8. Thereinafter the description of embodiments of the concept of the prediction mode of the present application are presented along with a description as to how such concepts could be built into the video encoder and decoder of FIGS. 6 and 7, respectively, although the embodiments described with the subsequent FIG. 9 and following, may also be used to form video encoder and video decoders not operating according to the coding framework underlying the video encoder and video decoder of FIGS. 6 and 7.

Figure 1:
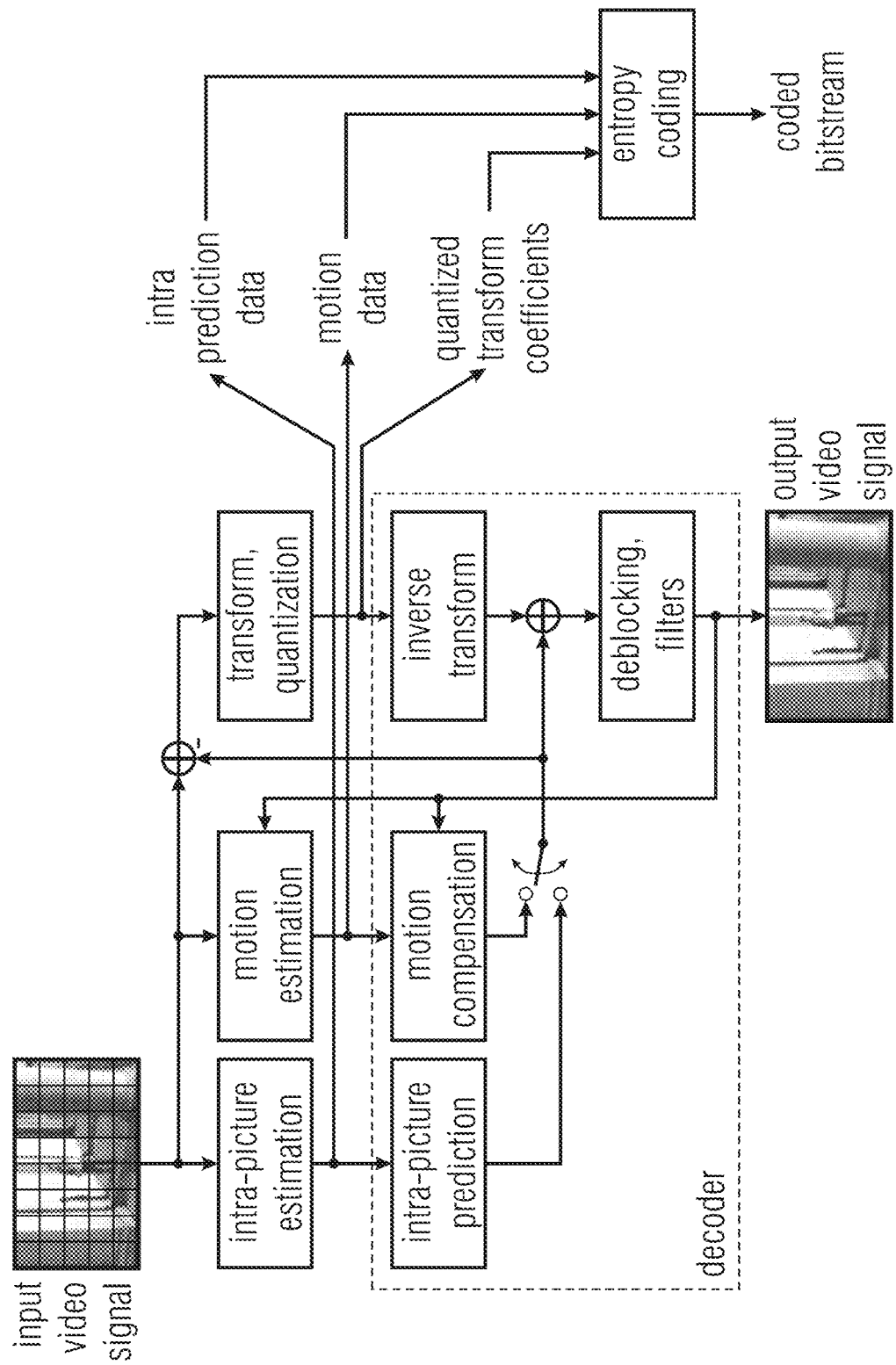
FIG. 1 shows an image diagram of a hybrid codec apparatus of conventional technology.
Figure 2:
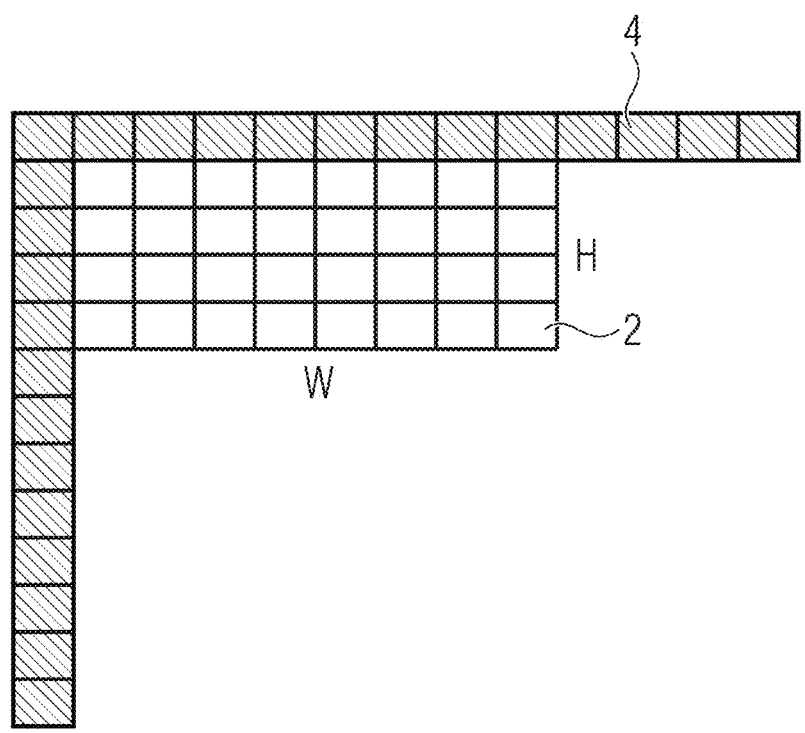
FIG. 2 shows a schematic diagram of blocks of a picture, wherein the blocks are target blocks to be predicted.
Figure 3:
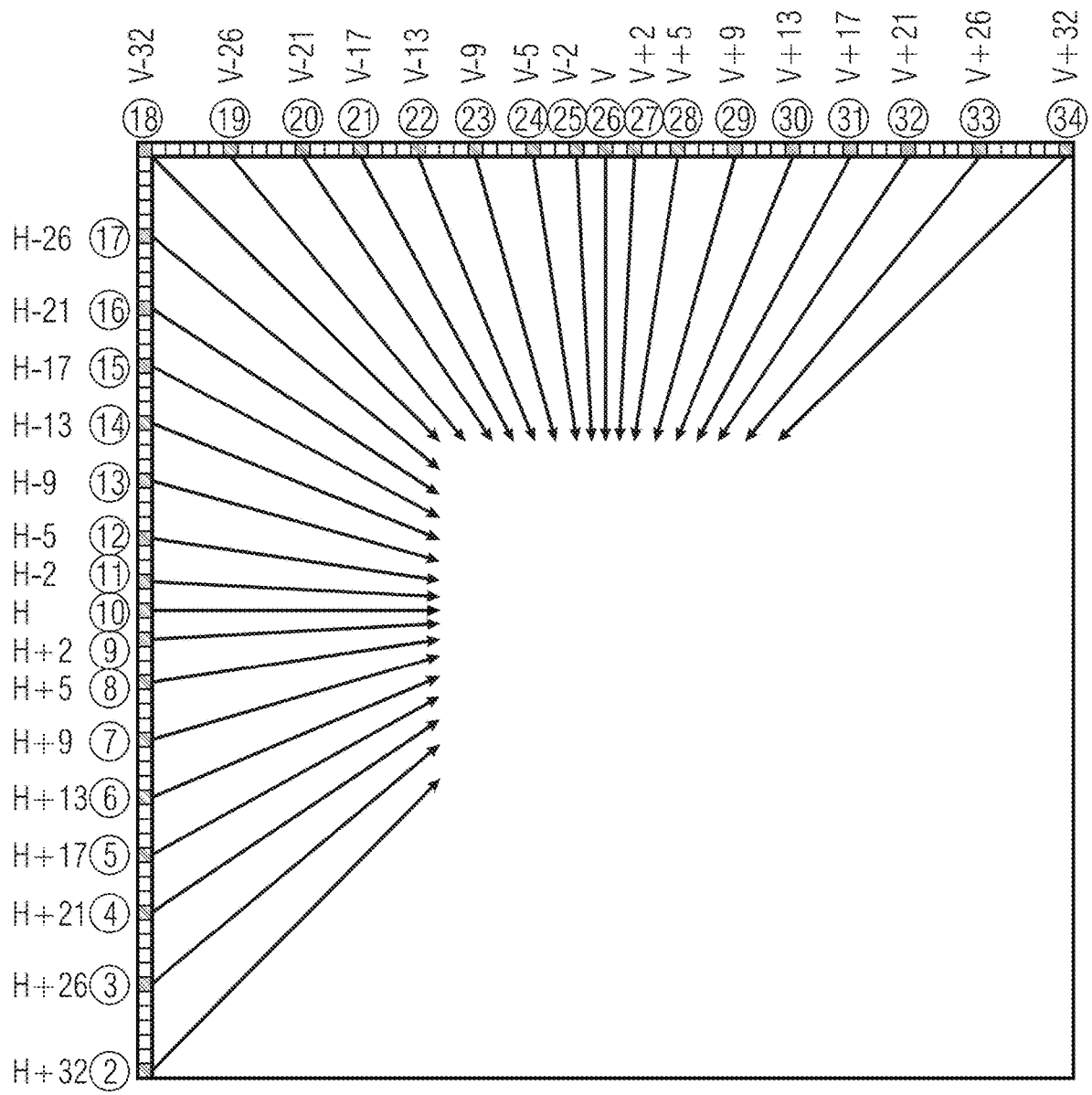
FIG. 3 shows a schematic diagram to explain angular prediction directions in conventional angular prediction mode.
Figure 4:
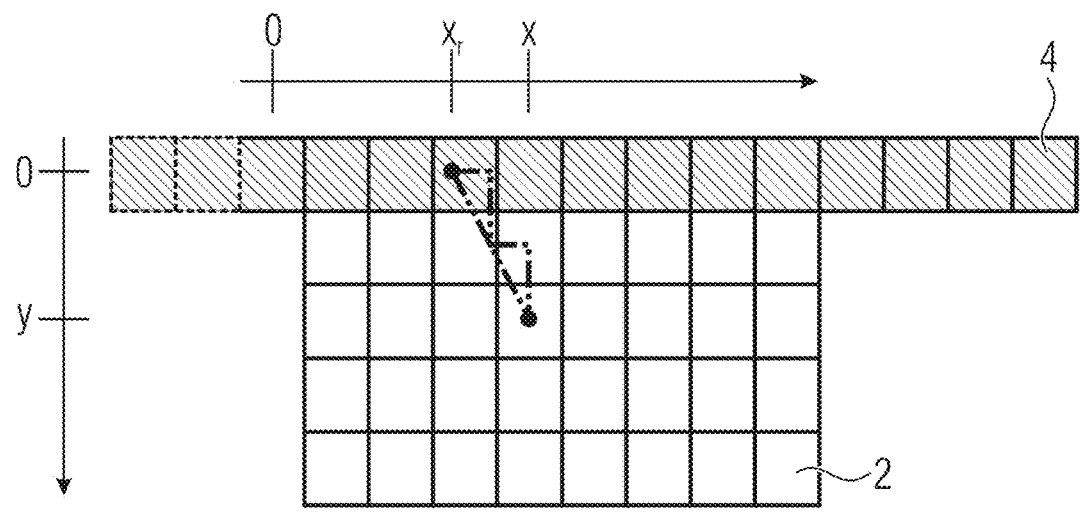
FIG. 4 shows a schematic diagram to explain a relationship between predicted and reference samples for the conventional angular mode.
Figure 5:
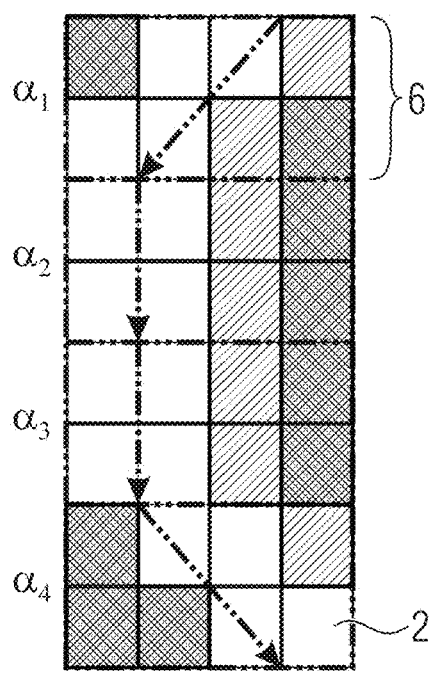
FIG. 5 shows a schematic diagram illustrating the conventional angular prediction mode for a lager block size.
Figure 6:
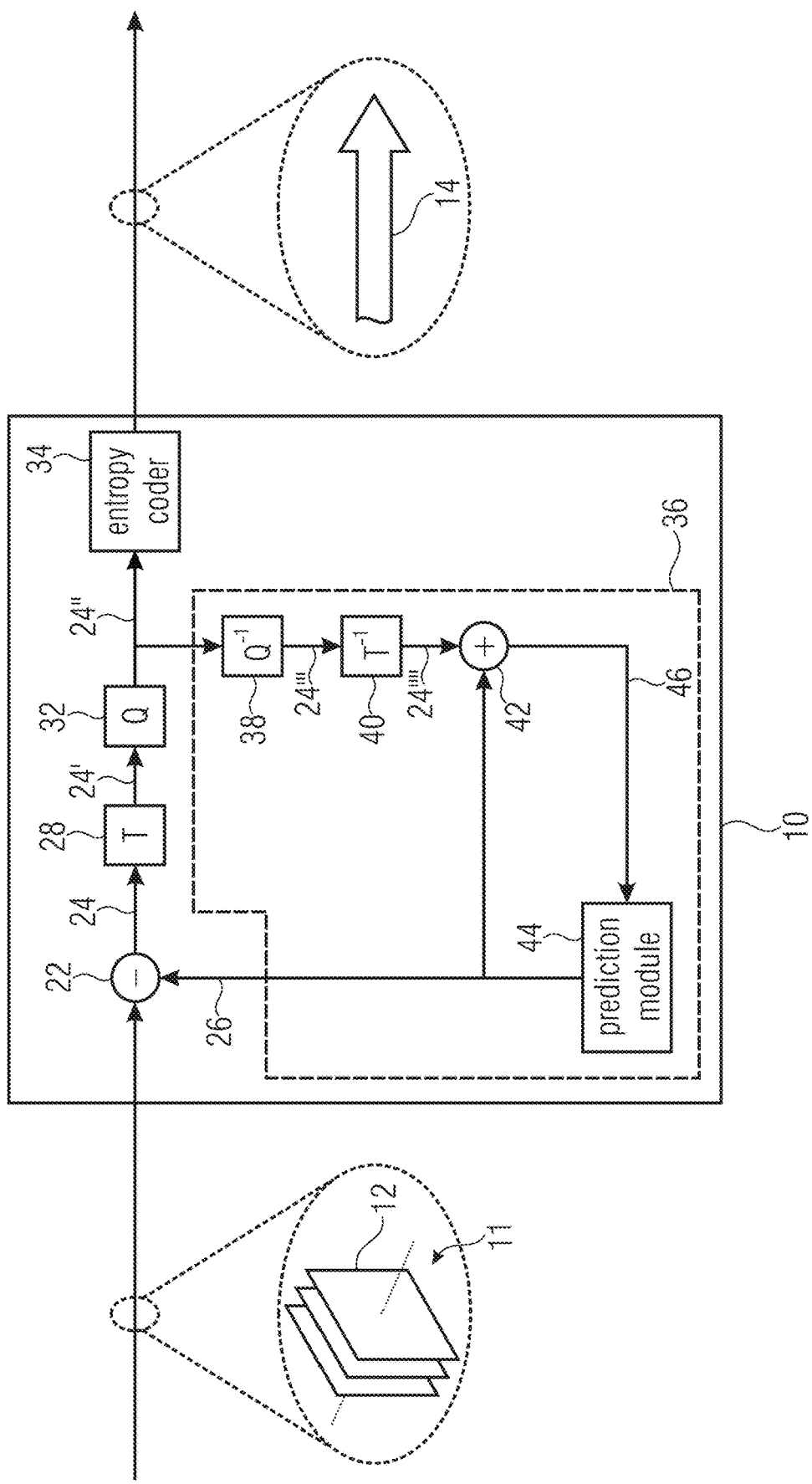
FIG. 6 shows a block diagram of an apparatus for predictively coding a video as an example for a video decoder where a prediction mode according to embodiments of the present application could be implemented.
Figure 7:
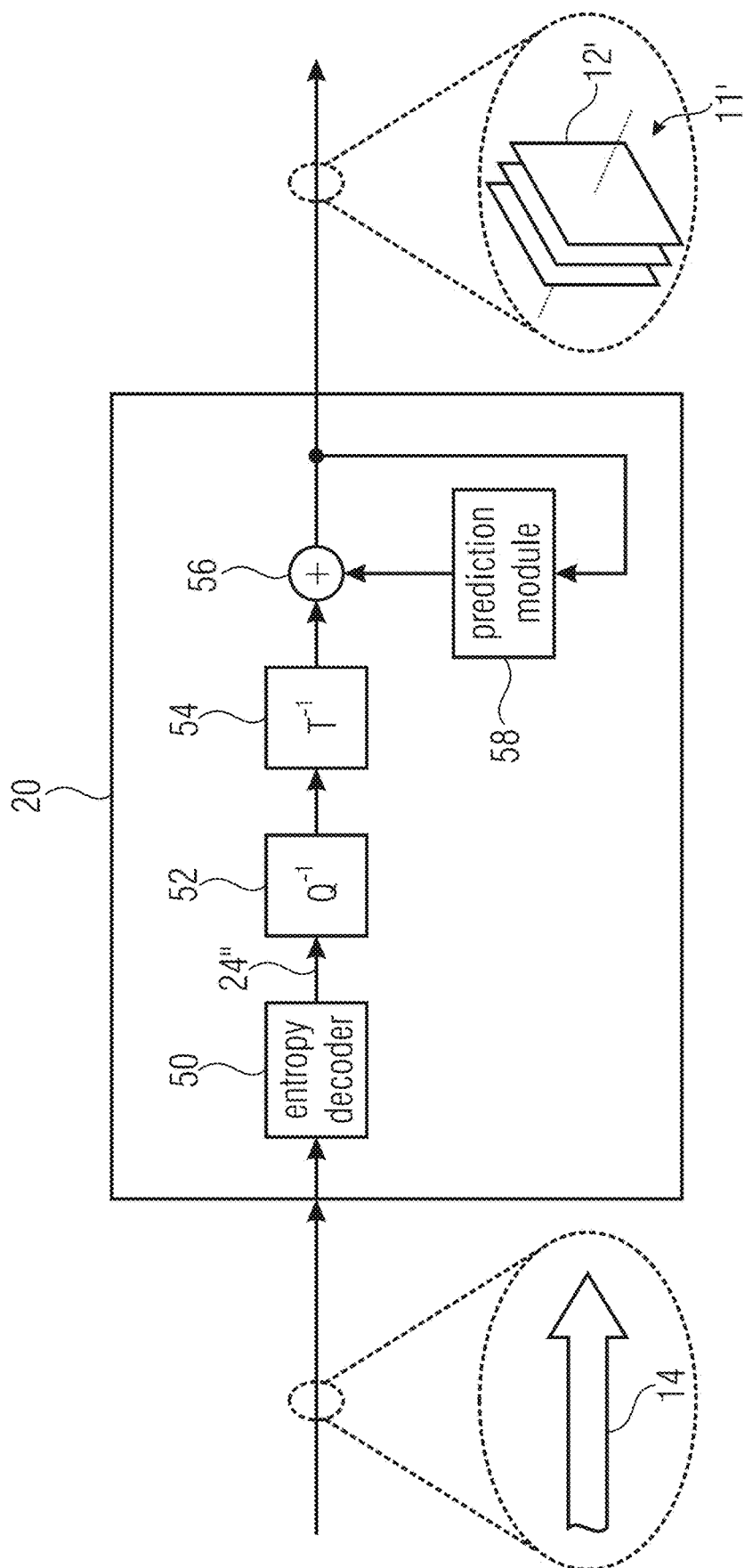
FIG. 7 shows a block diagram of an apparatus for predictively decoding a video, which fits to the apparatus of FIG. 6, as an example for a video decoder where a prediction mode according to embodiments of the present application could be implemented.

FIG. 6 shows an apparatus for predictively coding a video 11 composed of a sequence of pictures 12 into a data stream 14. Block-wise predictive coding is used to this end. Further, transform-based residual coding is exemplarily used. The apparatus, or encoder, is indicated using reference sign 10. FIG. 7 shows a corresponding decoder 20, i.e. an apparatus 20 configured to predictively decode the video 11' composed of pictures 12' in picture blocks from the data stream 14, also here exemplarily using transform-based residual decoding, wherein the apostrophe has been used to indicate that the pictures 12' and video 11', respectively, as reconstructed by decoder 20 deviate from pictures 12 originally encoded by apparatus 10 in terms of coding loss introduced by a quantization of the prediction residual signal. FIG. 6 and FIG. 7 exemplarily use transform based prediction residual coding, although embodiments of the present application are not restricted to this kind of prediction residual coding. This is true for other details described with respect to FIGS. 6 and 7, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. video 11 or a current picture 12. The prediction residual signal former 22 may, for instance, be a subtractor which subtracts the prediction signal from the original signal, i.e. current picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into data stream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" decoded into and decodable from, data stream 14. To this end, the prediction stage 36 may internally, as is shown in FIG. 6, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'.

A prediction module 44 of prediction stage 36 then generates the prediction signal 26 on the basis of signal 46 by using, for instance, spatial prediction, i.e. intra prediction, and/or temporal prediction, i.e. inter prediction. Details in this regard are described in the following.

Likewise, decoder 20 may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 7, the output of combiner 56 results in the reconstructed signal, namely the video 11' or a current picture 12' thereof.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost, and/or using some rate control. As described in more details below, encoder 10 and decoder 20 and the corresponding modules 44, 58, respectively, support different prediction modes such as intra-coding modes and inter-coding modes which form a kind of set or pool of primitive prediction modes based on which the predictions of picture blocks are composed in a manner described in more detail below. The granularity at which encoder and decoder switch between these prediction compositions may correspond to a subdivision of the pictures 12 and 12', respectively, into blocks. Note that some of these blocks may be blocks being solely intra-coded and some blocks may be blocks solely being inter-coded and, optionally, even further blocks may be blocks obtained using both intra-coding and inter-coding, but details are set-out hereinafter. According to intra-coding mode, a prediction signal for a block is obtained on the basis of a spatial, already coded/decoded neighborhood of the respective block. Several intra-coding sub-modes may exist the selection among which, quasi, represents a kind of intra prediction parameter. There may be directional or angular intra-coding sub-modes according to which the prediction signal for the respective block is filled by extrapolating the sample values of the neighborhood along a certain direction which is specific for the respective directional intra-coding sub-mode, into the respective block. The intra-coding sub-modes may, for instance, also comprise one or more further sub-modes such as a DC coding mode, according to which the prediction signal for the respective block assigns a DC value to all samples within the respective block, and/or a planar intra-coding mode according to which the prediction signal of the respective block is approximated or determined to be a spatial distribution of sample values described by a two-dimensional linear function over the sample positions of the respective block with deriving tilt and offset of the plane defined by the two-dimensional linear function on the basis of the neighboring samples. Compared thereto, according to inter-prediction mode, a prediction signal for a block may be obtained, for instance, by temporally predicting the block inner. For parametrization of an inter-prediction mode, motion vectors may be signaled within the data stream, the motion vectors indicating the spatial displacement of the portion of a previously coded picture of the video 11 at which the previously coded/decoded picture is sampled in order to obtain the prediction signal for the respective block. This means, in addition to the residual signal coding comprised by data stream 14, such as the entropy-coded transform coefficient levels representing the quantized spectral-domain prediction residual signal 24'', data stream 14 may have encoded thereinto prediction related parameters for assigning to the blocks prediction modes, prediction parameters for the assigned prediction modes, such as motion parameters for inter-prediction modes, and, optionally, further parameters which control a composition of the final prediction signal for the blocks using the assigned prediction modes and prediction parameters as will be outlined in more detail below. Additionally, the data stream may comprise parameters controlling and signaling the subdivision of picture 12 and 12', respectively, into the blocks. The decoder 20 uses these parameters to subdivide the picture in the same manner as the encoder did, to assign the same prediction modes and parameters to the blocks, and to perform the same prediction to result in the same prediction signal.

Figure 8:
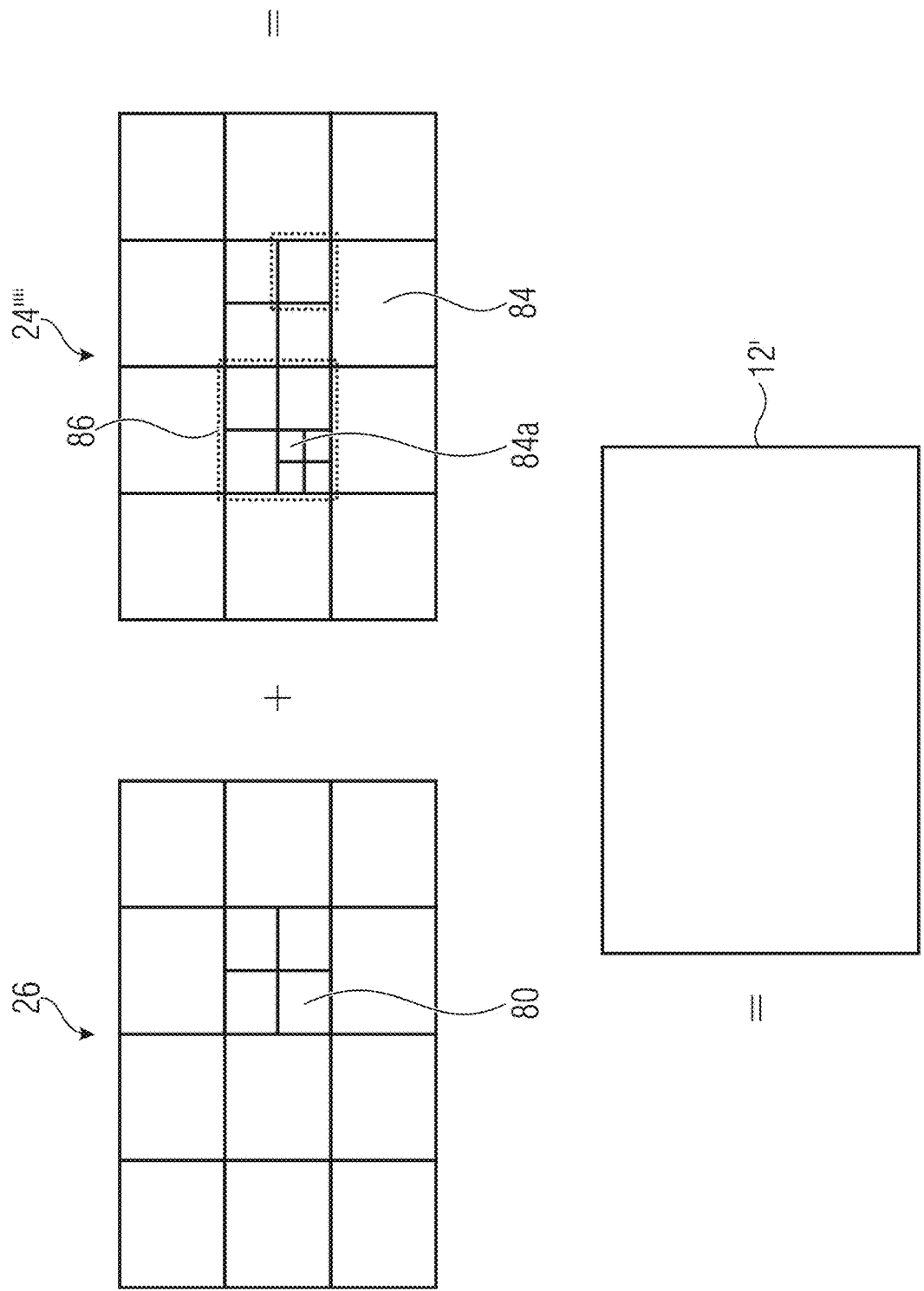
FIG. 8 shows a schematic diagram illustrating an example for a relationship between a prediction residual signal, a prediction signal and a reconstructed signal so as to illustrate possibilities of setting subdivisions for defining the prediction signal, handling the prediction residual signal and the like, respectively.

FIG. 8 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 8 as a subdivision of the picture area into blocks 80 of varying size, although this is merely an example. The subdivision may be any subdivision, such as a regular subdivision of the picture area into rows and columns of blocks, or a multi-tree subdivision of picture 12 into leaf blocks of varying size, such as a quadtree subdivision or the like, wherein a mixture thereof is illustrated in FIG. 8 where the picture area is firstly subdivided into rows and columns of tree-root blocks which are then further subdivided in accordance with a recursive multi-tree subdivisioning to result into blocks 80.

The prediction residual signal 24'''' in FIG. 8 is also illustrated as a subdivision of the picture area into blocks 84. These blocks might be called transform blocks in order to distinguish same from the coding blocks 80. In effect, FIG. 8 illustrates that encoder 10 and decoder 20 may use two different subdivisions of picture 12 and picture 12', respectively, into blocks, namely one subdivisioning into coding blocks 80 and another subdivision into blocks 84. Both subdivisions might be the same, i.e. each block 80, may concurrently form a transform block 84 and vice versa, but FIG. 8 illustrates the case where, for instance, a subdivision into transform blocks 84 forms an extension of the subdivision into blocks 80 so that any border between two blocks 80 overlays a border between two blocks 84, or alternatively speaking each block 80 either coincides with one of the transform blocks 84 or coincides with a cluster of transform blocks 84. However, the subdivisions may also be determined or selected independent from each other so that transform blocks 84 could alternatively cross block borders between blocks 80. As far as the subdivision into transform blocks 84 is concerned, similar statements are thus true as those brought forward with respect to the subdivision into blocks 80, i.e. the blocks 84 may be the result of a regular subdivision of picture area into blocks, arranged in rows and columns, the result of a recursive multi-tree subdivisioning of the picture area, or a combination thereof or any other sort of segmentation. Just as an aside, it is noted that blocks 80 and 84 are not restricted to being quadratic, rectangular or any other shape. Further, the subdivision of a current picture 12 into blocks 80 at which the prediction signal is formed, and the subdivision of a current picture 12 into blocks 84 at which the prediction residual is coded, may not be the only subdivision used for coding/decoding. These subdivision from a granularity at which prediction signal determination and residual coding is performed, but firstly, the residual coding may alternatively be done without subdivisioning, and secondly, at other granularities than these subdivisions, encoder and decoder may set certain coding parameters which might include some of the aforementioned parameters such as prediction parameters, prediction signal composition control signals and the like.

FIG. 8 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments such as prediction signals obtained from other views or from other coding layers which are coded/decoded in a separate prediction loop with separate DPB, for instance.

In FIG. 8, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
DST-VII
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Inverse DST-VII
Identity Transformation (IT)

In any case, it should be noted that the set of supported transforms may comprise merely one transform such as one spectral-to-spatial or spatial-to-spectral transform.

As already outlined above, FIGS. 6 to 8 have been presented as an example where the composed-prediction concept described further below may be implemented in order to form specific examples for video encoders and decoders according to the present application. Insofar, the video encoder and decoder of FIGS. 6 and 7, respectively, represent possible implementations of the video encoders and decoders described herein below. As will be outlined in more detail below, when having the subsequently explained embodiments for composed prediction according to the present application built into the video encoder and decoder of FIGS. 6 and 7, the video encoder of FIG. 6 and the video decoder of FIG. 7 support, at least as one option, to process a block 80 in the manner outlined in more detail below, or even all blocks a current picture 12 is composed of. Thus, the embodiments described hereinafter, inter alias, refer to a video encoder which equals the encoder 10 of FIG. 6 which treats blocks 80 in the manner outlined in more detail below and the same applies with respect to the decoder of FIG. 7 which, thus, represents an example for a video decoder according to an embodiment where blocks 80 are treated in the manner outlined in more detail below. FIGS. 6 and 7 are, however, only specific examples. A video encoder according to embodiments of the present application may, however, perform block-based encoding using the concept outlined in more detail below and being different from the encoder of FIG. 6 such as, for instance, in that the sub-division into blocks 80 is performed in a manner different than exemplified in FIG. 8, or in that this encoder does not use transform prediction residual coding with coding the prediction residual, for instance, in spatial domain directly instead. Likewise, video decoders according to embodiments of the present application may perform decoding from data stream 14 using the composed-prediction coding concept further outlined below, but may differ, for instance, from the decoder 20 of FIG. 7 in that sub-divides picture 12' into blocks in a manner different than described with respect to FIG. 8 and/or in that same does not derive the prediction residual from the data stream 14 in transform domain, but in spatial domain, for instance.

In particular, with respect to the block-subdivisioning into blocks 80, it is noted that same may be done in the manner outlined with respect to FIG. 8 or in a different manner. A subdivisioning into transform blocks, if present, may also be done as described with respect to FIG. 8 or in a different manner. In particular, the subdivisioning into blocks on the one hand and into other blocks on the other hand, such as transform blocks, may be done independent from each other by separately subdividing picture 12 into these blocks, respectively, or in a dependent manner. For instance, one subdivision such as the subdivision into transform blocks may form an extension of the other subdivision as described above, or both subdivisions may form separate extensions of a common primary subdivision such as, for instance, the subdivision of the picture into an array of tree root blocks as described with respect to FIG. 8. And such possibilities also apply for other sub-picture granularities which will be mentioned below such as with respect to the definition of certain prediction parameters, prediction modes, contribution weights or the like. Different subdivisions may be used for different ones of these entities and same may be defined independent from each other, partially independent or as extensions from one another.

As already explained, it is known that the samples of the block are predicted in a line-by-line order and therefore, rows and columns are swapped for horizontal angular prediction. The prediction mode of the present application, i.e., the contour prediction mode also needs to distinguish between horizontal and vertical contour patterns. Thus, the outline of the prediction process is similar to angular prediction, with swapping rows and columns for horizontal contour patterns and filling the block with shifted reference samples in a line-by-line order.

Contrary to the angular mode (i.e., with constant offset α), the contour mode, i.e., the prediction mode according to the present application, involves using a sequence of offsets with one individual value α(y) per line, i.e., the offset value is defined for each line of the samples or each group of the lines of the samples. The length of the sequence corresponds to the height of the block for vertical and to the width for horizontal contour mode, respectively. For the sample at position (x,y) the corresponding reference sample position is defined as:

$$x_r = x + \sum_{n=1}^{y} \alpha(n)$$

with offsets $\alpha(n) \in [-1,1]$.

This is the most general representation of the contour sequence and all alternative representations in the context of below explained offset variations can be converted to this general representation.

For coding efficiency and implementation reasons, the properties of the contour sequence can be constraint as follows:

Integer step:
Similar to the limited number of supported angular directions with integer offsets $\Delta x_D$ (used for the conventional angular mode), the contour offsets are typically expressed as base 32 integer offsets $\Delta x_C(n) \in [-32 \ldots 32]$ with $$\alpha(n) = \frac{\Delta x_C(n)}{32}.$$

All supported offset values together define the list or set C (for example {−32, 0, 32}, {−16, −8, −4, 0, 4, 8, 16}, or {−32, −13, 32}). In case C is symmetrical and regular, it can also be defined by parameters like step size and number of steps. For implementations, the contour sequence information, i.e., list or set C indexing a parameter is transmitted in the bit stream, the size of C is usually rather small.

In the list or set C, a global offset value for the respective block 2, a first predetermined offset value and a second offset value are included as indexable parameters. For example, the list or set C (hereinafter it is written as list C) indicates {−32, 0, 32}, the first predetermined offset value is −32 (or +32), the global offset value is 0, and the second predetermined offset value is +32 (or −32). However, list C may be larger than having cardinality three. The cardinality may depend on the global offset value and/or an additional number of offset values between the first predetermined offset value and the global offset value and/or between the global offset value and the second predetermined offset value may depend on the global offset value. For example, at least 2 more offset values could be defined between the first predetermined offset value and the global offset value, and between the global offset value and the global offset value respectively, thereby resulting in a total of 7 indexable offset values. This could apply for all values of the global offset value or merely for ones in a certain interval near the middle between the first predetermined offset value and the second predetermined offset value. For instance, if the global offset value has almost the same value as the first predetermined offset value, then, the numbers of the additional offset values between the first predetermined offset value and the global offset value comprised by the list C could be 1 or 0, while the number of the additional offset value comprised by the list C between the global offset value and the second offset value could be 3. In addition, if the global offset value has almost the same value as the second predetermined offset value, then, the numbers of the additional offset values between the global offset value and the second predetermined offset value comprised by the list C could be 1 or 0, while the number of the additional offset value comprised by the list C between the first predetermined offset value and the global offset value could be 3. Thus, the numbers of the additional offset values between the first predetermined offset value and the global offset value, and between the global offset value and the second offset value based on the global offset value.

Figure 9:
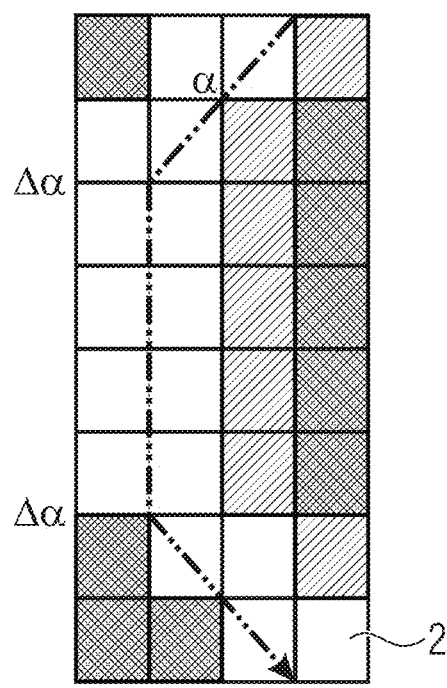
FIG. 9 shows a schematic diagram illustrating a prediction mode according to the concept of the present application for a larger block size.

Multiline:
  The offset value is constant for a group of k lines, i.e. offset value $\alpha(y)$ can only change every $k^{th}$ prediction line. Typical values for k are 2 and 4. FIG. 9 shows an example for k=2. That is, the prediction direction may be changed from line to line with an offset value signaled for all lines except one which adopts, for instance, the prediction direction signaled for the whole block in form of a prediction mode, but an alternative, the predetermined direction might be changed in unit of groups of one or more lines, with an offset value being signaled for (all) group(s) of lines except the group of lines which adopts, for instance, the prediction direction signaled for the whole block in form of a prediction mode. The prediction residual might be signaled in the data stream for the whole block in a manner connectively the prediction signal once after having sequentially predicted all lines or line groups. In case of vary one sample, they may differ in size. That is, k may vary within the current block.

Relative offset:
  The offset sequence represents relative offset differences $\Delta\alpha(n)$ instead of absolute offset values $\alpha(n)$, such that $\alpha(n)=\alpha(n-1)+\Delta\alpha(n)$. That is, the offset value for the current block is defined based on the offset value for the previously predicted block.
  This involves using an initial value $\alpha(0)$, which is either set to zero or predicted from previous coded blocks left/above the current block, in case they are angular or contour mode. That is, the offset value is determined based on the offset value for the previously predicted line of samples.

List index:
  The contour sequence represents indices i(n) of list C instead of offset values. In the prediction process the actual offset value is then derived via list lookup as C[i(n)].

Figure 10A:
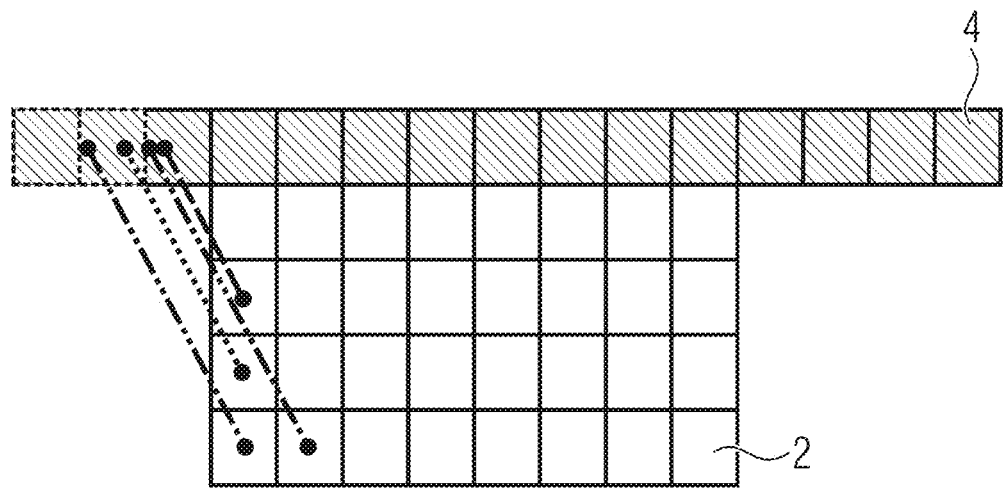
FIG. 10(a) shows a schematic diagram illustrating a direction across the respective block in an angular prediction mode.
Figure 10B:
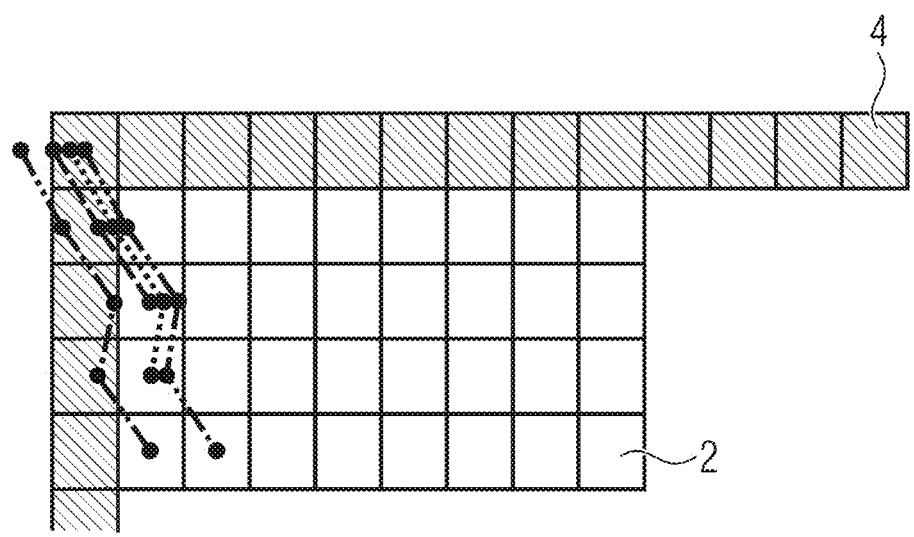
FIG. 10(b) shows a schematic diagram illustrating a direction across the respective block in a prediction mode according to the concept of the present application.

Regarding the prediction process, FIG. 10 illustrates one important difference between the angular mode and the contour mode, namely how side reference samples are accessed during line-by-line prediction, i.e., after swap for horizontal modes, reference samples 4 above the block 2 are referred to main and those left of the block to side reference samples 4, respectively. That is, as shown in FIG. 10 (a), in the angular mode, reference samples 4 above the block are referred to samples (in the line of blocks 2 to be predicted). Contrary to this, as shown FIG. 10 (b), in the contour mode, both reference samples 4 in the above and the side of the block 2 are referred to samples to be predicted.

In detail, for the angular prediction as shown in FIG. 10 (a), the line of main reference samples 4 is extended to the left by projecting side reference samples 4 to the corresponding position using the direction or angle determined by offset $\alpha$. Consequently, the prediction process does not have to distinguish between positive and negative reference sample positions ($x_r$ can become negative if $\alpha<0$).

For the contour prediction, as shown in FIG. 10 (b), the line of main reference samples 4 cannot be extended by projected side reference samples 4. Due to the non-linear contour sequence, there is no bijective correspondence between side and main reference sample positions, i.e., two different side reference positions map to the same main reference position or vice versa. Therefore, the contour mode's prediction process has to distinguish between positive and negative reference sample positions 4. In case $x_r<0$ the side reference position $y_r$ is derived and used for prediction. Note that this would also work for the angular prediction by not extending the main reference samples, but directly using side reference position $$y_r = y + \frac{1}{\alpha} \cdot x$$

in case $x_r<0$. For the contour prediction, however, deriving $y_r$ is not directly possible as $\alpha(y)$ changes from line to line. One solution is to step backwards in the contour sequence until $\Sigma_{n\leq y}\alpha(n)=-x$ and subtract the number of steps from y. For a higher precision, a fractional last step can be applied in case a full step would lead to a value $<-x$. Another solution is to use the average slope of the contour sequence up to the current line as $$y_r = y + \frac{y}{\Sigma_{n=1}^{y}\alpha(n)} \cdot x.$$

Regarding contour derivation and signaling, the contour mode can either
  estimate the contour sequence at the encoder 10, transmit the information in the data stream 14, and apply it at the decoder 20 as described above, or
  predict the contour sequence from the information of previously coded blocks at the encoder 10 and decoder 20 and apply it at in the decoder 20 as described above without transmitting it in the data stream, or
  combine estimation and prediction of the contour sequence.

In case the contour sequence is estimated at the encoder 10, the original signal can be used as a reference for rate-distortion RD optimization. This allows selecting the contour sequence with the lowest RD cost, but the information has to be included in the data stream. Thus, the challenging aspect is efficient signaling of the contour sequence, i.e. restricting and reducing the amount of transmitted information as much as possible. This can be achieved by applying the constraints using the integer step, multiline, relative offset or list index as explained above together with codes that are adapted to the data statistics (fixed length, truncated unary, etc.) and CABAC (Context Adaptive Binary Arithmetic Coding).

In case the contour sequence is predicted at encoder 10 and decoder 20, no information has to be included in the data stream 14, but the original signal cannot be used as a reference. For predicting the contour sequence from information that is also available at the decoder 20, two types of information can be used: one is structural information like block 2 partitioning and angular mode direction, and the other is the reconstructed signal in the vicinity of the current block 2. For the latter the area left of the side reference samples can be used as a template block 2, where the reconstructed signal serves as the reference for a minimum distortion derivation of the contour sequence, which is then used to predict the current block 2. However, this assumes that the texture of the current block 2 has the same contour than the template block.

It should be also noted that the contour mode according to the present application is implemented as an extension to the conventional angular mode and can be applied as an optional feature to all intra luma blocks. The contour sequence is estimated at the encoder 10, transmitted in the data stream and applied as part of the intra prediction/reconstruction process at the decoder 20.

For example, the contour mode according to the present application is embodied as follows. The contour sequence is derived by determining the offset values using the given values of $\Delta x_D$ for the conventional angular mode, the set of integer offsets C is $\{-32, \Delta x_D, 32\}$. The stored and transmitted contour sequence represents indices i(n) of list C relative to the position of $\Delta X_D$, such that $i \in \{-1, 0, 1\}$ corresponds to $\{-32, \Delta x_D, 32\}$. For efficient signaling, the set of offsets is reduced to $\{\Delta x_D, 32\}$ if $\Delta x_D = -32$ and to $\{-32, \Delta x_D\}$ if $\Delta x_D = 32$, resulting in indices $\{0, 1\}$ and $\{-1, 0\}$, respectively.

Then, the contour mode is signaled by transmitting in the data stream as follows: in case the transmitted luma mode of a block corresponds to an angular mode, first a flag is transmitted that indicates whether contour mode is applied for this block or not. For contour mode, the flag is followed by the sequence of indices i(n).

In this embodiment, multiline is not used, such that the length of the transmitted sequence of indices i(n) corresponds to the height of the block for vertical and to the width for horizontal angular modes, respectively. For every index i(n) a first bit indicated whether the value is zero or not. In the latter case a second bit indicates sign, i.e. whether the index is −1 or +1. The second bit is not necessary for the special cases mentioned above, where $\Delta x_D = \pm 32$ and only two index values are allowed.

The prediction process of this embodiment follows the explained contour mode in the above referring to FIG. 10 (b), directly applying the side reference samples using position $y_r$ derived via stepping backward in the contour sequence and fractional refinement for the last step. The edge and boundary filters known for some implementations of angular prediction are not used for contour prediction.

At the encoder 10 the contour sequence is derived in a line-wise process (after swapping rows and columns for horizontal angular/contour modes). The first line is predicted as described above with each of the possible offsets $\{-32, \Delta x_D, 32\}$. The decision for one offset is made by estimating the RD cost, namely the distortion in terms of the sum of squared differences (SSD) between the resulting line of predicted sample values and the line of original sample values and the rate by adding a penalty value for offsets other than $\Delta x_D$, i.e., $i(n) \neq 0$, which involve using an additional bit for signaling the sign. The offset with the lowest RD cost value is selected for the first line and the process is successively repeated for all remaining lines as illustrated in FIG. 11.

Figure 11:
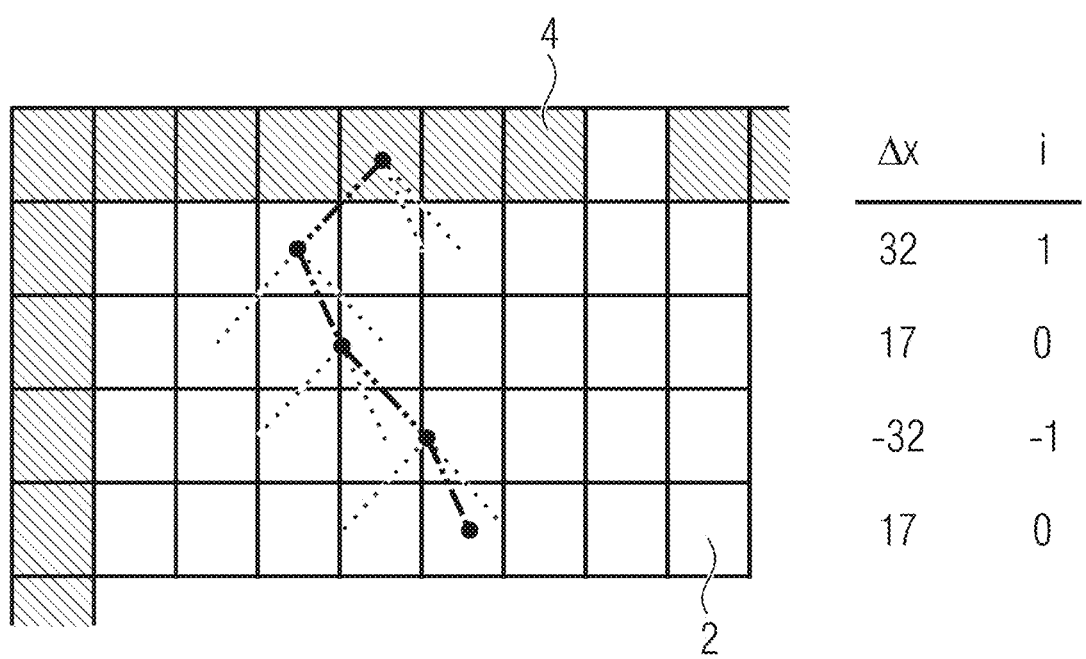
FIG. 11 shows a schematic diagram illustrating an estimation process of a prediction direction across the respective block at in a prediction mode at encoder according to the concept of the present application.

In FIG. 11, the reference samples are positioned directly neighboring to the block. However, the reference samples do not necessarily have to be positioned to directly neighbor the block. For instance, the reference samples may be positioned at one or more samples away from a border of the current block.

The contour mode according to the present application can be implemented as a separate mode or as an extension to the conventional angular mode.

In the above described embodiments, horizontal contour prediction is explained, i.e., the line of the samples comprises row and therefore, direction across the respective block from information included in the data stream is relatively horizontal. However, in case the line of samples comprises columns, then the direction across the respective block is relatively vertical.

In addition, further to the above explained embodiments, the contour mode can be for example also:

applied to different channel types (e.g., luma/chroma/depth map)

applied to different (e.g., rectangular) block sizes and shapes applied to different types of reference samples (e.g., original/filtered/displaced)

combined with different interpolation filters (e.g., linear 2-tap/non-linear 4-tap)

combined with different post-processing filters (e.g., edge/boundary filters)

combined with any kind of residual coding.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the present application can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the present application, the subject-matter comprise a data carrier having electronically readable control signals, which are capable of cooperating with a programmable computer system, such that one of the methods described herein is performed.

Generally, embodiments of the present application can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the present application comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The above embodiments, inter alia, prevailed, the video decoder for supporting a prediction mode for predicting blocks of a video, wherein the video decoder is configured to predict each of the blocks by extrapolating a neighborhood of the respective block into the block along a direction which varies across the respective block.

The video decoder is configured to vary the direction across the respective block by determining an offset value for each line of samples of lines of samples the respective block is composed of, the offset value indicating an offset of sample positions at which the neighborhood is to be sampled for predicting the respective line relative to further sample positions at which the neighborhood is to be sampled for predicting a line of samples adjacent to the respective line towards the neighborhood, or for each of groups of lines of samples into which block is partitioned.

The video decoder is configured to read for each line of samples or for each group of lines a parameter indexing one of a set of offset values comprising, a global offset value for the respective block, a first predetermined offset value, and a second predetermined offset value, wherein the first predetermined offset value and the second predetermined offset value indicate offsets of the sample positions relative to the further sample positions into opposite directions.

The video decoder, wherein the set of the offset values additionally comprises a first set of one or more offset values each of which indicates an offset of the sample positions relative to the each sample positions between the first predetermined offset value and the global offset value, and/or a second set of one or more offset values each of which indicates an offset of the sample positions relative to the each sample positions between the global offset value and the second predetermined offset value.

The video decoder is configured to determine, for the respective block, the global offset value by prediction or based on a prediction parameter comprised by a data stream for the respective block.

The video decoder is configured to determine, for the respective block, the global offset value by selecting same among possible values between the first and second predetermined offset values.

The video decoder is configured to derive the direction across the respective block from information included in a data stream, wherein the information indicates one of a horizontal setting where the lines of samples are columns and a vertical setting where the lines of the samples are rows.

The invention claimed is:

1. A video decoder for supporting a prediction mode for predicting blocks of a video, wherein the video decoder is configured to predict each of the blocks by extrapolating a neighborhood of the respective block into the block along a direction which varies across the respective block so that the direction for a current block to be predicted is changed based on a sample block which has been previously predicted, wherein the video decoder is configured:

to vary the direction across the respective block in unit of lines of samples the respective block is composed of, or in unit of groups of lines of samples into which the block is partitioned, based on one or more offset values indicating an offset of sample positions at which the neighborhood is to be sampled for predicting a predetermined line or predetermined group of lines relative to further sample positions at which the neighborhood is to be sampled for predicting a further line or further group of lines adjacent to the predetermined line or predetermined group of lines, and to read for each line of samples or for each group of lines a parameter indexing one of a set of offset values comprising:
a global offset value for the respective block,
a first predetermined offset value, and
a second predetermined offset value,
wherein the first predetermined offset value and the second predetermined offset value are determined by reading the parameter indexing which is transmitted in a bitstream,
wherein the first predetermined offset value and the second predetermined offset value indicate offsets of the sample positions relative to the further sample positions into opposite directions, and
wherein the global offset value is an offset value between the first and the second predetermined offset values.

2. The video decoder according to claim 1, wherein the set of the offset values additionally comprises a first set of one or more offset values each of which indicates an offset of the sample positions relative to the each sample positions between the first predetermined offset value and the global offset value, and/or a second set of one or more offset values each of which indicates an offset of the sample positions relative to the each sample positions between the global offset value and the second predetermined offset value.

3. The video decoder according to claim 1, configured to determine, for the respective block, the global offset value by prediction or based on a prediction parameter comprised by a data stream for the respective block.

4. The video decoder according to claim 1, configured to determine, for the respective block, the global offset value by selecting same among possible values between the first and second predetermined offset values.

5. The video decoder according to claim 1, configured to derive the direction across the respective block from information comprised by a data stream, wherein the information indicates one of a horizontal setting where the lines of samples are columns and a vertical setting where the lines of the samples are rows.

6. A video encoder for supporting a prediction mode for predicting blocks of a video, wherein the video decoder is configured to predict each of the blocks by
extrapolating a neighborhood of the respective block into the block along a direction which varies across the respective block so that the direction for a current block to be predicted is changed based on a sample block which has been previously predicted,
wherein the video encoder is configured:
to vary the direction across the respective block in unit of lines of samples the respective block is composed of, or in unit of groups of lines of samples into which the block is partitioned, based on one or more offset values indicating an offset of sample positions at which the neighborhood is to be sampled for predicting a predetermined line or predetermined group of lines relative to further sample positions at which the neighborhood is to be sampled for predicting a further line or further group of lines adjacent to the predetermined line or predetermined group of lines, and
to read for each line of samples or for each group of lines a parameter indexing one of a set of offset values comprising:
a global offset value for the respective block,
a first predetermined offset value, and
a second predetermined offset value,
wherein the first predetermined offset value and the second predetermined offset value are determined by reading the parameter indexing which is transmitted in a bitstream,
wherein the first predetermined offset value and the second predetermined offset value indicate offsets of the sample positions relative to the further sample positions into opposite directions, and
wherein the global offset value is an offset value between the first and the second predetermined offset values.

7. The video encoder according to claim 6, wherein the set of the offset values additionally comprises a first set of one or more offset values each of which indicates an offset of the sample positions relative to the each sample positions between the first predetermined offset value and the global offset value, and/or a second set of one or more offset values each of which indicates an offset of the sample positions relative to the each sample positions between the global offset value and the second predetermined offset value.

8. The video encoder according to claim 6, configured to determine, for the respective block, the global offset value by prediction or based on a prediction parameter comprised by a data stream for the respective block.

9. The video encoder according to claim 6, configured to determine, for the respective block, the global offset value by selecting same among possible values between the first and second predetermined offset values.

10. The video encoder according to claim 6, configured to derive the direction across the respective block from information comprised by a data stream, wherein the information indicates one of a horizontal setting where the lines of samples are columns and a vertical setting where the lines of the samples are rows.

11. A method for supporting a prediction mode for predicting blocks of a video, wherein the video decoder is configured to predict each of the blocks by
extrapolating a neighborhood of the respective block into the block along a direction which varies across the respective block so that the direction for a current block to be predicted is changed based on a sample block which has been previously predicted,
wherein the video encoder is configured:
to vary the direction across the respective block in unit of lines of samples the respective block is composed of, or in unit of groups of lines of samples into which the block is partitioned, based on one or more offset values indicating an offset of sample positions at which the neighborhood is to be sampled for predicting a predetermined line or predetermined group of lines relative to further sample positions at which the neighborhood is to be sampled for predicting a further line or further group of lines adjacent to the predetermined line or predetermined group of lines, and
to read for each line of samples or for each group of lines a parameter indexing one of a set of offset values comprising:
a global offset value for the respective block,
a first predetermined offset value, and
a second predetermined offset value,
wherein the first predetermined offset value and the second predetermined offset value are determined by reading the parameter indexing which is transmitted in a bitstream,
wherein the first predetermined offset value and the second predetermined offset value indicate offsets of the sample positions relative to the further sample positions into opposite directions, and wherein the global offset value is an offset value between the first and the second predetermined offset values.

12. A non-transitory digital storage medium having a computer program stored thereon to perform the method for supporting a prediction mode for predicting blocks of a video, wherein the video decoder is configured to predict each of the blocks by extrapolating a neighborhood of the respective block into the block along a direction which varies across the respective block so that the direction for a current block to be predicted is changed based on a sample block which has been previously predicted, when said computer program is run by a computer, wherein the video encoder is configured:

to vary the direction across the respective block in unit of lines of samples the respective block is composed of, or in unit of groups of lines of samples into which the block is partitioned, based on one or more offset values indicating an offset of sample positions at which the neighborhood is to be sampled for predicting a predetermined line or predetermined group of lines relative to further sample positions at which the neighborhood is to be sampled for predicting a further line or further group of lines adjacent to the predetermined line or predetermined group of lines, and to read for each line of samples or for each group of lines a parameter indexing one of a set of offset values comprising:

a global offset value for the respective block,
a first predetermined offset value, and
a second predetermined offset value, wherein the first predetermined offset value and the second predetermined offset value are determined by reading the parameter indexing which is transmitted in a bitstream, wherein the first predetermined offset value and the second predetermined offset value indicate offsets of the sample positions relative to the further sample positions into opposite directions, and wherein the global offset value is an offset value between the first and the second predetermined offset values.

\* \* \* \* \*